US007065471B2

(12) United States Patent
Gotoh et al.

(10) Patent No.: US 7,065,471 B2
(45) Date of Patent: Jun. 20, 2006

(54) METHOD AND SYSTEM FOR DIAGNOSING STATE OF GAS TURBINE

(75) Inventors: Jinichiro Gotoh, Tsuchiura (JP); Yasushi Hayasaka, Tsuchiura (JP); Shigeo Sakurai, Tsuchiura (JP); Hiraku Ikeda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 148 days.

(21) Appl. No.: 10/468,204

(22) PCT Filed: Jun. 18, 2001

(86) PCT No.: PCT/JP01/05176

§ 371 (c)(1),
(2), (4) Date: Aug. 18, 2003

(87) PCT Pub. No.: WO02/103177

PCT Pub. Date: Dec. 27, 2002

(65) Prior Publication Data

US 2004/0148129 A1      Jul. 29, 2004

(51) Int. Cl.
     *G06F 19/00*     (2006.01)
(52) U.S. Cl. .................. 702/183; 702/182; 702/185; 702/184; 700/287; 700/290
(58) Field of Classification Search ................ 702/183, 702/33, 34, 35, 36, 182, 187, 185; 700/108, 700/286, 287, 288, 289, 290; 340/635
     See application file for complete search history.

(56) References Cited

U.S. PATENT DOCUMENTS 5,447,059 A *   9/1995   Miller et al. .................. 73/116
6,260,004 B1 *  7/2001   Hays et al. .................. 702/183

(Continued)

FOREIGN PATENT DOCUMENTS

JP        02-294525        12/1990

(Continued)

OTHER PUBLICATIONS

International Preliminary Examination Report for PCT/JP01/05176, with partial English translation.

*Primary Examiner*—Patrick J. Assouad
(74) *Attorney, Agent, or Firm*—Crowell & Moring LLP

(57) ABSTRACT

An operation monitoring unit 11 for acquiring process data from sensors 10 installed to a gas turbine and operation information of the gas turbine; communication units 12, 14 for transmitting each of said two kinds of data on the gas turbine acquired in the operation monitoring unit 11; an analysis server 16 which calculates values of equivalent operating time using each of the two kinds of data obtained through the communication units 12, 14, the value of equivalent operating time evaluating a degree of damage of a diagnosed position for each of a plurality of degradation-and-damage modes, and calculates a value of whole equivalent operating time by adding the values of equivalent operating time for the individual degradation-and-damage modes; and a facility management unit 15 client-server systemized using the analysis server 16 and a WWW browser 20 or WWW server 19 are provided. By acquiring the above-described two kinds of data relating to the gas turbine during operating the gas turbine into the analysis server 16 through the communication units 12, 14, a highly accurate analysis result of damage condition can be speedy obtained from values of equivalent operating time for a plurality of degradation-and-damage modes. Further, it is also possible to provide convenience that a person in a remote site can speedy and easily view the analysis results using the WWW browser 20 through the client server system.

16 Claims, 12 Drawing Sheets

U.S. PATENT DOCUMENTS

| | | | |
|---|---|---|---|
| 6,324,659 B1 * | 11/2001 | Pierro | 714/48 |
| 6,330,525 B1 * | 12/2001 | Hays et al. | 702/183 |
| 6,405,108 B1 * | 6/2002 | Patel et al. | 701/29 |
| 6,505,143 B1 * | 1/2003 | Lakshminarasimha et al. | 702/183 |
| 6,772,051 B1 * | 8/2004 | Nagafuchi et al. | 700/287 |
| 6,801,871 B1 * | 10/2004 | Ishii et al. | 702/136 |
| 6,853,930 B1 * | 2/2005 | Hayashi et al. | 702/61 |
| 6,907,320 B1 * | 6/2005 | Nagafuchi et al. | 700/292 |
| 6,907,381 B1 * | 6/2005 | Hayashi et al. | 702/181 |
| 2001/0056315 A1 * | 12/2001 | Nagafuchi et al. | 700/286 |
| 2002/0035495 A1 * | 3/2002 | Spira et al. | 705/7 |
| 2002/0077711 A1 * | 6/2002 | Nixon et al. | 700/51 |
| 2002/0120412 A1 * | 8/2002 | Hayashi et al. | 702/61 |
| 2002/0123870 A1 * | 9/2002 | Chan et al. | 703/7 |
| 2002/0147506 A1 * | 10/2002 | Eryurek et al. | 700/28 |
| 2002/0174384 A1 * | 11/2002 | Graichen et al. | 714/37 |
| 2002/0184178 A1 * | 12/2002 | Tasooji et al. | 706/50 |
| 2003/0000199 A1 * | 1/2003 | Nagafuchi et al. | 60/39.24 |
| 2003/0004659 A1 * | 1/2003 | Hayashi et al. | 702/60 |
| 2003/0105544 A1 * | 6/2003 | Kauffman et al. | 700/109 |
| 2003/0120402 A1 * | 6/2003 | Jaw | 701/29 |
| 2004/0148132 A1 * | 7/2004 | Hayashi et al. | 702/184 |
| 2004/0181369 A1 * | 9/2004 | Hayashi et al. | 702/184 |
| 2004/0184203 A1 * | 9/2004 | Nagafuchi et al. | 361/20 |
| 2004/0254684 A1 * | 12/2004 | Nagafuchi et al. | 700/286 |

FOREIGN PATENT DOCUMENTS

| | | |
|---|---|---|
| JP | 07-065081 | 3/1995 |
| JP | 08-044421 | 2/1996 |
| JP | 10-196403 | 7/1998 |
| JP | 10-293049 | 11/1998 |
| JP | 11-003113 | 1/1999 |
| JP | 2001-32724 | 2/2001 |
| JP | 2001-125933 | 5/2001 |
| JP | 2001-32724 | 6/2001 |

* cited by examiner

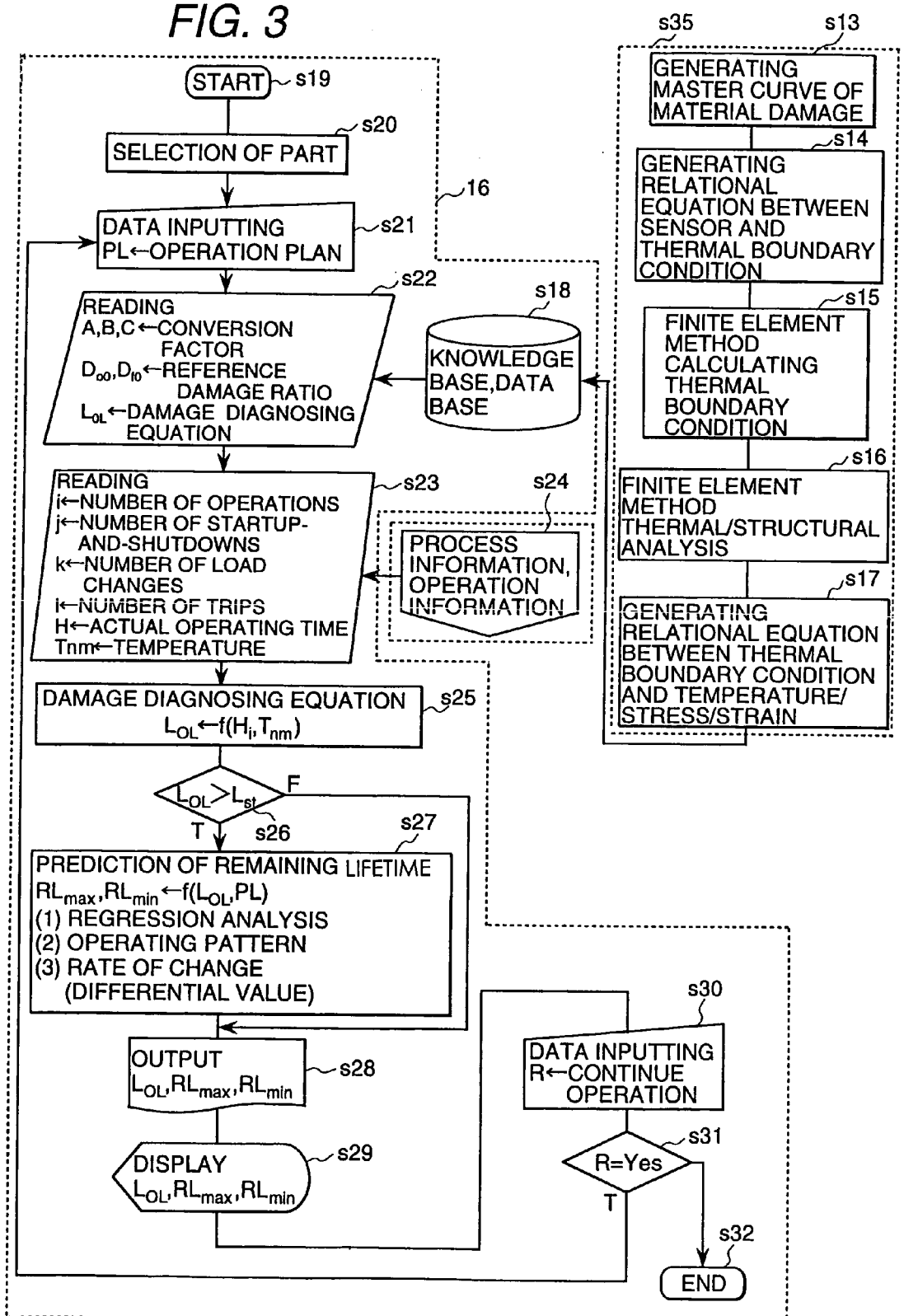

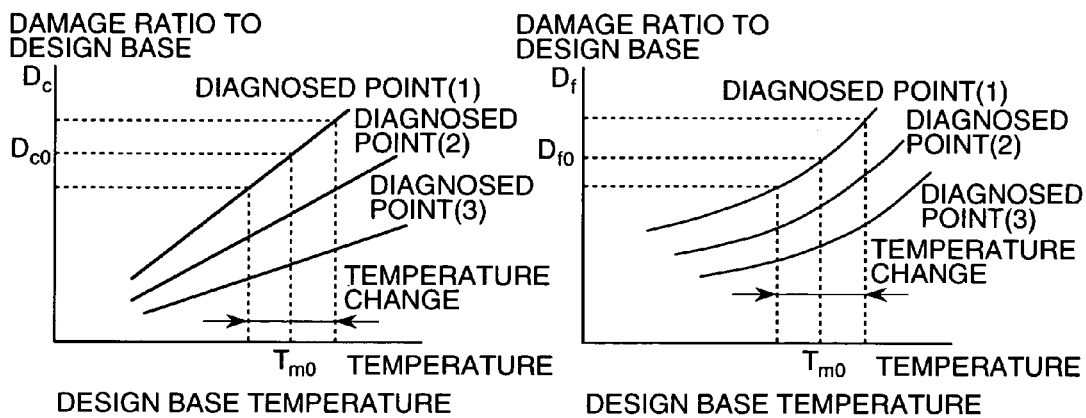

FIG. 8

| PROCESS INFORMATION | | OPERATION INFORMATION | | MAINTENANCE INFORMATION | |
|---|---|---|---|---|---|
| (1) EXHAUST GAS TEMPERATURE | :a1 | (1) NUMBER OF STARTUP-AND-SHUTDOWNS | :b1 | (1) CRACK LENGTH | :c1 |
| (2) WHEEL SPACE TEMPERATURE | :a2 | (2) COMBUSTION TIME | :b2 | (2) NUMBER OF CRACKS | :c2 |
| (3) DISCHARGE AIR TEMPERATURE | :a3 | (3) NUMBER OF TRIPS | :b3 | (3) THINNED-DOWN WEIGHT OF WALL | :c3 |
| (4) DISCHARGE AIR PRESSURE | :a4 | (4) NUMBER OF LOAD CHANGES | :b4 | (4) THINNED-DOWN VOLUME OF WALL | :c4 |
| (5) COMBUSTOR FLAME STABILIZER TEMPERATURE | :a5 | (5) POWER GENERATING OUTPUT | :b5 | (5) THINNED-DOWN AREA OF WALL | :c5 |
| (6) FUEL FLOW RATE | :a6 | (6) POWER GENERATING EFFICIENCY | :b6 | (6) NUMBER OF THINNED WALL PORTIONS | :c6 |
| (7) INLET AIR TEMPERATURE | :a7 | (7) COMPRESSOR EFFICIENCY | :b7 | (7) PEELED AREA OF COATING | :c7 |
| (8) INLET AIR PRESSURE | :a8 | (8) ACTUAL OPERATING TIME | :b8 | (8) NUMBER OF PEELED COATING PORTION | :c8 |
| (9) INLET AIR HUMIDITY | :a9 | | | (9) CORRODED AREA | :c9 |
| (10) INLET ADJUSTABLE BLADE ANGLE | :a10 | | | (10) NUMBER OF CORRODED PORTIONS | :c10 |
| (11) ROTATING SPEED | :a11 | | | (11) DATE OF SCHEDULED INSPECTION | :c11 |
| (12) BEARING VIBRATION | :a12 | | | (12) NUMBER OF SCHEDULED INSPECTIONS | :c12 |
| (13) SHAFT VIBRATION | :a13 | | | (13) NUMBER OF WATER CLEANING OPERATIONS OF COMPRESOR | :c13 |
| (14) BEARING METAL TEMPERATURE | :a14 | | | (14) DATE OF WATER CLEANING OPERATION OF COMPRESSOR | :c14 |
| (15) PRESSURE AT EACH STAGE OF COMPRESSOR | :a15 | | | (15) pH OF WATER USED FOR WATER CLEANING OPERATION OF COMPRESSOR | :c15 |
| (16) AIR TEMPERATURE AT EACH STAGE OF COMPRESSOR | :a16 | | | | |
| (17) PRESSURE CHANGE AT EACH STAGE OF COMPRESSOR | :a17 | | | | |
| (18) Na SENSOR OF SUCTION AIR | :a18 | | | | |
| (19) COMPRESSOR BLADE STRESS | :a19 | | | | |
| (20) COMPRESSOR BLADE TEMPERATURE | :a20 | | | | |
| (21) TURBINE BLADE STRESS | :a21 | | | | |
| (22) TURBINE BLADE TEMPERATURE | :a22 | | | | |
| (23) COMBUSTOR STRESS | :a23 | | | | |
| (24) COMBUSTOR TEMPERATURE | :a24 | | | | |
| (25) CASING TEMPERATURE | :a25 | | | | |
| (26) CASING STRESS | :a26 | | | | |
| (27) CASING ACCELERATION | :a27 | | | | |
| (28) CASING DISPLACEMENT | :a28 | | | | |
| (29) EXHAUST GAS COMPONENTS | :a29 | | | | |
| (30) FUEL COMPONENTS | :a30 | | | | |

FIG. 9

| DIAGNOSED COMPONENT PART | MONITORING ITEM DETERIORATION/ DAMAGE MODE (DAMAGE MODEL) | INPUT INFORMATION PROCESS INFORMATION, OPERATION INFORMATION | |
|---|---|---|---|
| COMBUSTOR | | | |
| LINER :d1 | THERMAL FATIGUE :e1 (CRACK GENERATION, PROGRESS) | NUMBERS OF START UP-AND-SHUTDOWNS, LOAD CHANGES, TRIPS | :b1,b3,b4 |
| | | EXHAUST GAS TEMPERATURE | :a1 |
| | | DISCHARGE AIR TEMPERATURE | :a3 |
| | | FLAME STABILIZER TEMPERATURE | :a5 |
| | CREEP :e2 DEFORMATION (CREEP RUPTURE) | ACTUAL OPERATING TIME | :b8 |
| | | EXHAUST GAS TEMPERATURE | :a1 |
| | | DISCHARGE AIR TEMPERATURE | :a3 |
| | | FLAME STABILIZER TEMPERATURE | :a5 |
| | OXIDATIVE, :e3 CORROSIVE WALL THINNING | NUMBER OF STARTUP-AND-SHUTDOWN | :b1 |
| | | ACTUAL OPERATING TIME | :b8 |
| | | EXHAUST GAS TEMPERATURE | :a1 |
| | | DISCHARGE AIR TEMPERATURE | :a3 |
| TRANSITION PIECE :d2 | THERMAL FATIGUE :e1 (CRACK GENERATION, PROGRESS) | NUMBERS OF START UP-AND-SHUTDOWNS, LOAD CHANGES, TRIPS | :b1,b3,b4 |
| | | EXHAUST GAS TEMPERATURE | :a1 |
| | | DISCHARGE AIR TEMPERATURE | :a3 |
| | | FLAME STABILIZER TEMPERATURE | :a5 |
| | CREEP :e2 DEFORMATION (CREEP RUPTURE) | ACTUAL OPERATING TIME | :b8 |
| | | EXHAUST GAS TEMPERATURE | :a1 |
| | | DISCHARGE AIR TEMPERATURE | :a3 |
| | | FLAME STABILIZER TEMPERATURE | :a5 |
| TURBINE | | | |
| STATOR BLADE :d3 | THERMAL FATIGUE :e1 (CRACK GENERATION, PROGRESS) | NUMBERS OF START UP-AND-SHUTDOWNS, LOAD CHANGES, TRIPS | :b1,b3,b4 |
| | | EXHAUST GAS TEMPERATURE | :a1 |
| | | DISCHARGE AIR TEMPERATURE | :a3 |
| | CREEP :e2 DEFORMATION (CREEP RUPTURE) | ACTUAL OPERATING TIME | :b8 |
| | | EXHAUST GAS TEMPERATURE | :a1 |
| | | DISCHARGE AIR TEMPERATURE | :a3 |
| | OXIDATIVE, :e3 CORROSIVE WALL THINNING | NUMBER OF STARTUP-AND-SHUTDOWN | :b1 |
| | | ACTUAL OPERATING TIME | :b8 |
| | | EXHAUST GAS TEMPERATURE | :a1 |
| ROTOR BLADE :d4 | THERMAL FATIGUE :e1 (CRACK GENERATION, PROGRESS) | NUMBERS OF START UP-AND-SHUTDOWNS, LOAD CHANGES, TRIPS | :b1,b3,b4 |
| | | EXHAUST GAS TEMPERATURE | :a1 |
| | | DISCHARGE AIR TEMPERATURE | :a3 |
| | | WHEEL SPACE TEMPERATURE | :a2 |
| | CREEP :e2 DEFORMATION (CREEP RUPTURE) | ACTUAL OPERATING TIME | :b8 |
| | | EXHAUST GAS TEMPERATURE | :a1 |
| | | DISCHARGE AIR TEMPERATURE | :a3 |
| | | WHEEL SPACE TEMPERATURE | :a2 |
| | OXIDATIVE, :e3 CORROSIVE WALL THINNING | NUMBER OF STARTUP-AND-SHUTDOWN | :b1 |
| | | ACTUAL OPERATING TIME | :b8 |
| | | EXHAUST GAS TEMPERATURE | :a1 |

FIG. 14

FACILITY OPERATION INFORMATION

FACILITIES IN SERVICE AT PRESENT

| EQUIPMENT CODE | CUSTOMER | MODEL | OPERATION START DATE | OPERATING TIME AT PRESENT | PLANNED MAINTENANCE DATE |
|---|---|---|---|---|---|
| ... | ··· POWER COMPANY | ... | 1998/···/··· | ... | 2001/···/··· |
| ... | ··· COMPANY | ... | 1999/···/··· | ... | 2002/···/··· |
| | | | | | |
| | | | | | |
| | | | | | |

FACILITIES OUT OF SERVICE AT PRESENT

| EQUIPMENT CODE | CUSTOMER | MODEL | OPERATION START DATE | OPERATING TIME AT PRESENT | PLANNED MAINTENANCE DATE |
|---|---|---|---|---|---|
| ... | ··· POWER COMPANY | ... | 1997/···/··· | ... | 2000/···/··· |
| ... | ··· COMPANY | ... | 1998/···/··· | ... | 2001/···/··· |
| | | | | | |

DAMAGE DIAGNOSIS | REMAINING LIFETIME EVALUATION | DAMAGE CASE SEARCH

REPAIR PARTS

SERVICE CENTER | TOP Page | RETURN

METHOD AND SYSTEM FOR DIAGNOSING STATE OF GAS TURBINE

BACKGROUND OF THE INVENTION

1. Field of the Invention

The present invention relates to a technical field of diagnosing a damage condition of a gas turbine.

2. Prior Art

As an electric power generating facility and/or a heat supplying facility using a gas turbine, a gas turbine electric power generating plant, a combined electric power generating plant and a cogeneration plant are known. In the combined power plant, electric power is generated by combining a gas turbine and a steam turbine. On the other hand, in the cogeneration plant, electric power is generated by a gas turbine, and heat to be used for making hot water and heating rooms is produced by operation of the gas turbine.

The total equipment and the total number of components used in the plant reaches several tens of thousands. The equipment and the components composing the plant deteriorate with time so as to be in danger of causing a failure of the plant. Therefore, in order to stably supply electric power and heat by maintaining integrity of the plant, maintenance after occurrence of a failure in the equipment or the components composing the plant, that is, ex post facto maintenance, is sometimes performed.

However, preventive maintenance by scheduled inspection and repairs as a precaution is preferable if present operating conditions and failure conditions of the equipment and components composing the plant are known and their remaining lifetimes can be estimated.

As to prior art examples with respect to the preventive maintenance, the following technologies exist.

In a technology disclosed in Japanese Laid-Open Patent Application No. 2-294525, temperatures, stresses, strains and strain energies of high temperature component parts are estimated from values of operating conditions of a turbine, and then an amount of damage are checked every operation using operation data such as operating time, number of startup-and-shutdown times and so on. However, in the above prior art example, only the "cracks" are taken into consideration as the damage. In addition, the load change during normal operation is not taken into consideration.

In a technology disclosed in Japanese Laid-Open Patent Application No. 10-196403, an equivalent operating time for each of the components/parts, taking into account the operating time or the number of startup-and-shutdown times, the operating load condition and so on, is calculated by inputting present conditions and plant experience data stored in a unit provided in the plant, and the amount of damage is checked using the equivalent operating time. However, in this prior art example, the equivalent operating time can not be calculated until a start-and-stop operation is completed, that is, the equivalent operating time is not calculated in real time. Therefore, the effect of load change during the normal operation can not be taken into consideration, and further the damage and lifetime diagnosis can not be performed during operation in real time.

In a technology disclosed in Japanese Laid-Open Patent Application No. 10-293049, degradation and damage conditions of the gas turbine component parts after inspection such as scheduled inspection are predicted by inspecting the degradation and damage conditions of the gas turbine every inspection using practical degradation and damage inspection equipment and evaluating the degradation and damage condition using remaining lifetime diagnosing equipment. Therefore, in this prior art, the degradation and damage diagnosis is not performed either in real time during operation or after completion of each operation because the degradation and damage states are inspected every inspection.

In a technology disclosed in Japanese Laid-Open Patent Application No. 11-3113, degradation of a plurality of equipment units is efficiently diagnosed and managed by performing the diagnosis of equipment from a remote site. In the prior art example, there is no specific suggestion with respect to the method of diagnosing the degradation of equipments.

In a technology disclosed in Japanese Laid-Open Patent Application No. 7-65081, replacing timing of a component part and management of the replacing timing are performed based on consecutive hours using the component part. However, although the replacing timing in this prior art example is determined based on the consecutive using hours, an actual lifetime of component part can not generally be expressed only by the consecutive using hours, but the actual lifetime of component part can be accurately expressed when number of startup-and-shutdown times is also taken into consideration.

In a technology disclosed in Japanese Laid-Open Patent Application No. 8-44421, management of damage amount is performed based on cracks which are postulated to be mainly dominated by a number of startup-and-shutdown times, and maintenance and management support of the equipment is performed using a means for measuring degradation and damage amount of structural members, a means for recording operation history, a means for managing data and so on. However, since the degradation diagnosis predicting progress of damage is performed by calculation based on an estimated operating condition, the progressing condition of damage corresponding to the actual condition during operation is not known. Therefore, there is possibility that the actual condition of lifetime of the component part can not accurately be expressed.

DISCLOSURE OF THE INVENTION

An object of the present invention is to improve the accuracy of diagnosing a state of a gas turbine.

As basic methods capable of attaining the object of the present invention, the following methods of diagnosing a condition of a gas turbine can be proposed. That is, a method of diagnosing a condition of a gas turbine comprises the steps of calculating a value of first equivalent operating time relating to creep damage of a component part composing the gas turbine using operation data of a gas turbine and process data measured by sensors installed to the gas turbine during operation of the gas turbine; calculating a value of second equivalent operating time relating to fatigue damage of the component part using the operation data and the process data; calculating a value of third equivalent operating time based on the value of first equivalent operating time and the value of second equivalent operating time; and diagnosing a condition of the gas turbine based on the value of third equivalent operating time and a management basis (also referred to as a management base). Another method of diagnosing a condition of a gas turbine comprises the steps of calculating values of equivalent operating time for one degradation mode and another degradation mode using operation data of a gas turbine and process data measured by sensors installed to the gas turbine during operation of the gas turbine, the equivalent operating time evaluating a degree of damage of a component part composing the gas turbine using the unit of operating time; and diagnosing a condition of the gas turbine based on the calculated value of equivalent operating time and a predetermined management base. Still another method of diagnosing a condition of a gas turbine comprises the steps of calculating values of equivalent operating time using operation data of a gas turbine and process data measured by sensors installed to the gas turbine during operation of the gas turbine, the equivalent operating time evaluating a degree of damage of a component part composing the gas turbine using the unit of operating time; and diagnosing a condition of the gas turbine based on the calculated value of equivalent operating time and a predetermined management base. According to these methods, it is possible to provide a method which is capable of obtaining an analysis result of a degradation and damage condition in a short time and with high accuracy by taking process data and operation data associated with a gas turbine under operating conditions.

As basic systems capable of attaining the object of the present invention, the following systems for diagnosing a condition of a gas turbine can be proposed. That is, a system for diagnosing a condition of a gas turbine comprises a means for calculating a value of first equivalent operating time relating to creep damage of a component part composing the gas turbine using operation data of the gas turbine and process data measured by sensors installed to the gas turbine during operation of the gas turbine; a means for calculating a value of second equivalent operating time relating to fatigue damage of the component part using the operation data and the process data; a means for calculating a value of third equivalent operating time based on the value of first equivalent operating time and the value of second equivalent operating time; and a means for diagnosing a condition of the gas turbine based on the value of third equivalent operating time and a management base. Another system for diagnosing a condition of a gas turbine comprises a means for calculating values of equivalent operating time for one degradation mode and another degradation mode using operation data of the gas turbine and process data measured by sensors installed to the gas turbine during operation of the gas turbine, the equivalent operating time evaluating a degree of damage of a component part composing the gas turbine using the unit of operating time; and a means for diagnosing a condition of the gas turbine based on the value of equivalent operating time calculated by the calculating means and a predetermined management base. Still another system for diagnosing a condition of a gas turbine comprises a means for individually calculating values of equivalent operating time for a plurality of degradation modes using operation data of the gas turbine and process data measured by sensors installed to the gas turbine during operation of the gas turbine, the equivalent operating time evaluating a degree of damage of a component part composing the gas turbine using the unit of operating time; a means for calculating a value of whole equivalent operating time by adding the values of equivalent operating time for the individual degradation modes; and a means for diagnosing a condition of the gas turbine based on the calculated value of equivalent operating time and a predetermined management base. According to these systems, it is possible to provide a method which is capable of obtaining an analysis result of a degradation and damage condition in a short time and with high accuracy by taking process data and operation data associated with a gas turbine under operating conditions.

Another system capable of attaining the object of the present invention is a system for diagnosing a condition of a gas turbine which comprises an operation monitoring unit for acquiring process data from sensors installed to the gas turbine and operation data of the gas turbine; a communication unit for communicating the two kinds of data on the gas turbine acquired in the operation monitoring unit; and a facility managing unit having an analysis server and a WWW browser or WWW server. The analysis server calculates a value of equivalent operating time for evaluating a degree of damage of a diagnosed position for each of a plurality of degradation and damage modes from the two kinds of data on the gas turbine obtained through the communication unit to calculate a whole equivalent operating time by adding the individual values of equivalent operating time for the plurality of degradation and damage modes, and then diagnoses a condition of the gas turbine based on the calculated whole equivalent operating time and a predetermined management base. According to this system, it is possible to provide an apparatus which is capable of obtaining an analysis result of a degradation and damage condition from values of equivalent operating time for a plurality of individual degradation and damage modes in a short time and with high accuracy by taking process data and operation data associated with a gas turbine under operating conditions into analysis data, and it is also possible to provide the convenience that a person in remote site can speedily and easily obtain the analysis result using the WWW browser or the WWW server.

BRIEF DESCRIPTION OF THE DRAWINGS

FIG. 3 is a detailed flow diagram showing the processing of damage of the gas turbine in the embodiment of FIG. 1.

FIG. 4 shows graphs each expressing master curves with respect to damages of a material used in diagnosed points of the gas turbine.

FIG. 5 is a table showing analyzing conditions for an analysis by the finite element method.

FIG. 8 is a table showing process data, operation data and maintenance data which are applicable to the damage diagnosis for a high temperature component part and the lifetime diagnosis in the embodiment in accordance with the present invention.

FIG. 9 is a table showing the process data and the operation data to be applied to the embodiment in accordance with the present invention.

FIG. 14 is a view showing an output example of a WWW server/browser in an equipment management side in an embodiment in accordance with the present invention.

DESCRIPTION OF THE PREFERRED EMBODIMENTS

As an electric power generating facility and/or a heat supplying facility using a gas turbine, a gas turbine power plant, a combined power plant, in which electric power is generated by combining a gas turbine and a steam turbine, and a cogeneration plant, in which electric power is generated by a gas turbine and heat to be used for making hot water and heating rooms is produced by operation of the gas turbine, are known.

In the embodiments in accordance with the present invention described below, an electric power generating facility using a gas turbine (a gas turbine electric power generating facility) will be described.

The gas turbine employed in the electric power generating facility comprises a combustor 3, and the combustor 3 has a premixer for premixing fuel discharged from a fuel nozzle and air from a compressor 2; a cylindrical liner surrounding a region for generating a combustion gas by burning the premixed fluid from the premixer; and a transition piece for acting as a flow passage to the turbine, the transition piece being arranged down stream of the cylindrical liner, and these component parts are contained in an outer cylinder and a casing connected to the outer cylinder.

The gas turbine is constructed so that the rotor blades may be rotated by hitting the combustion gas in the gas turbine combustor to the stator blades and the rotor blades in the gas turbine 4 to obtain a rotating driving force for rotating a generator 5.

Therefore, in the gas turbine electric power generating facility, the high temperature component parts concentrically exist in the gas turbine. The high temperature component parts are components such as the combustor liner, the combustor transition piece, the stator blade and the rotor blade inside the turbine 4 which are shown in the column of diagnosed component parts of FIG. 9.

Figure 1:
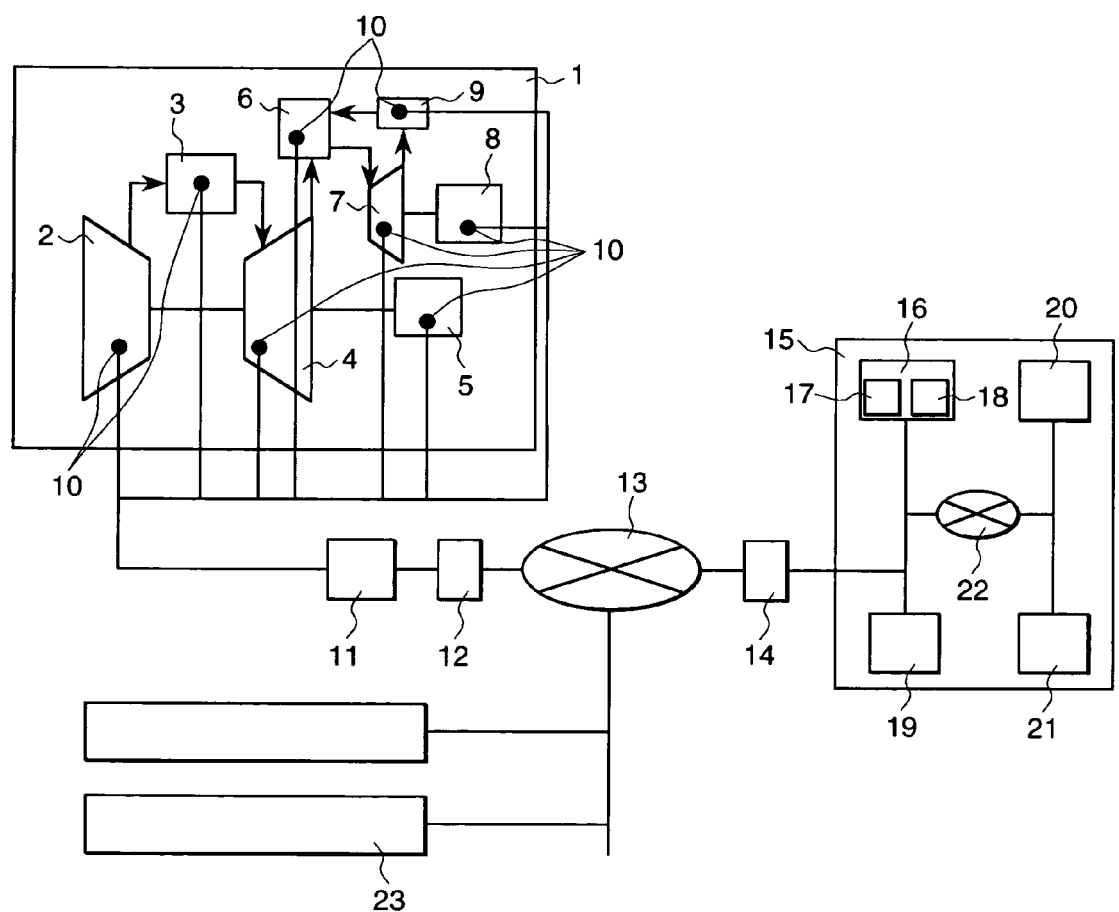
FIG. 1 is a block diagram showing the construction of an embodiment of a remote diagnosis system for gas turbine power generating facility in accordance with the present invention.

The gas turbine electric power generating facility 1 of FIG. 1 comprises the gas turbine composed of the gas turbine compressor 2, the combustor 3 and the turbine 4; the generator 5 driven by the gas turbine and so on. Further, in a case where the electric power generating facility is a combined electric power generating plant having a gas turbine as the main component, a waste heat recovery boiler 6, a steam turbine 7, a generator 8 driven by the steam turbine, and a condenser 9 are added.

These main equipments, that is, the compressor 2, the combustor 3, the turbine 4, the generators 5 and 8, the waste heat recovery boiler 6, the steam turbine 7, the condenser 9 and the other equipment are installed with various kinds of sensors 10 for monitoring conditions of these main components. These sensors 10 are connected to an operation monitoring unit 11 by cables, and process data is processed by or stored in the operation monitoring unit 11.

The operation monitoring unit 11 transmits the process data detected by the sensors 10 and operation data received from the gas turbine electric power generating facility and an operation control unit of the turbine to an equipment management unit 15 through a communication unit 12 in the operation monitoring unit side, a communication line 13 and a communication unit 14 in the equipment management unit. The operation monitoring unit 11 and the communication unit 12 in the operation monitoring unit side may be configured by a single electronic computer (a computer). Further, the communication unit 14 in the equipment management unit side may be contained in the equipment management unit 15.

As the communication line 13, a dedicated line such as a dialup line, an Internet line, a satellite line or the like is used. In a case of using the Internet line 13, a firewall for the Internet is connected to the communication unit 12 in the operation monitoring unit side and to the communication unit 14 in the equipment management unit side by taking security of the data into consideration.

Referring to FIG. 1, the sensors 10 installed to the components composing the gas turbine measure data expressing states of the equipment of the gas turbine, that is, process data relating to temperature, pressure and vibration, for example, process data relating to temperature such as exhaust gas temperature a1, discharged air temperature a3, and inlet air temperature a7; process data relating to pressure such as discharged air pressure a4, and inlet air pressure a8; and process data relating to vibration such as bearing vibration a12, and shaft vibration a13. The obtained process data is transmitted to the operation monitoring unit 11.

The operation monitoring unit 11 always judges whether or not the gas turbine electric power generating facility 1 under operating conditions is in the normal condition. The judgment whether the gas turbine under operation is normal or abnormal may employ a general abnormality judging method of a gas turbine under operation. For example, an abnormality judging method using allowable values of exhaust gas temperature and vibration as the reference values may be employed.

If the gas turbine electric power generating facility 1 is in the normal condition, the data measured by the sensors 10 and the operation data are stored in a data storing unit connected to the operation monitoring unit 11, and further, part of the data is transmitted to the equipment management unit 15 with a frequency of about once per day.

Particularly, data strongly relating to damage of important equipment of the gas turbine (temperature and pressure) is transmitted from the operation monitoring unit 11 to the equipment management unit 15 with a frequency of about once per second. If the gas turbine electric power generating facility 1 is in any abnormal condition, all the items of data obtained by the sensors 10 are transmitted to the equipment management unit 15 with a frequency of about once per second through the communication unit 12 in the electric power generating facility side, the communication line 13 and the communication unit 14 in the equipment management unit side. The data transmission frequencies are not limited to the above-mentioned frequencies; instead, arbitrary transmission frequencies corresponding to importance, urgency and economic feasibility of the data transmission of the gas turbine equipment, stability of the communication line, and so on may be used.

Although the equipment management unit 15 is composed of a plurality of electronic computers, a unit in FIG. 1 is shown as an example. The equipment management unit 15 is composed of an analysis server 16, a WWW sever 19, WWW browsers 20 and 21, a LAN 22 and so on.

The acronym WWW refers to the world wide web. Further, the acronym LAN means a local area network. The equipment management unit 15 forms a client server system. The term client sever system means a network system which is composed of a plurality of electronic computers and of which the function is separated into a server function and a client function. In the present specification, when the word WWW server is used, it is generally composed of a unit for driving WWW (a unit typically referred to as a computer or an electronic computer) and software (program). Similarly, when the word "analysis server" is used, it is recognized that it means a computer installed with a program for analysis and a program for a server.

In the analysis server 16, there are a database 17 with respect to damage and a knowledge base 18 with respect to damage. The equipment management unit 15 on FIG. 1 is composed of four electronic computers, namely the analysis sever 16, the WWW server 19, and the WWW browsers 20 and 21. However, the number of the connected electronic computers may be increased or decreased. The analysis sever 16, the WWW server 19, and the WWW browsers 20 and 21 need not be installed in a single place, but they may be separately installed, for example, in a research section, in a maintenance and safekeeping (planning) section, in a design section and so on. Each of the electronic computers comprises a display unit with a screen and a manual input means such as keyboard.

Irrespective of the normal or abnormal condition of the gas turbine electric power generating facility, the various kinds of process data and operation data transmitted from the operation monitoring unit 11 are transmitted to the analysis sever 16 in the equipment management unit 15 to be stored into the database 17 inside the analysis server 16. The process data is values of state measured as an operating result such as number of startup-and-shutdown times b1, number of trip shutdown times b2, power generating output b5 etc, and these values are generally monitored by the sensors but not controlled. The exceptions are fuel flow rate a6 and inlet adjustable blade angle a10. On the other hand, the operation data is elements determined by an operator, are generally values measured from an operation control panel and are collected mainly in the operation monitoring unit 11. As described above, the operation data is essentially obtained from the control panel for operating the gas turbine. Usually, in the control panel, there are operation control signal (startup, shutdown and fuel flow rate commands) data, and a monitor for monitoring these signals. Since the supervisory monitoring unit on the control panel is included in the operation monitoring unit 11 of FIG. 1, the operation monitoring unit 11 can collect the operation data.

The process data from the sensors 10 installed to the gas turbine electric generating facility 1 and the operation data from the operation monitoring unit 11 and various kinds of data analyzed and processed in the analysis server 16 can be accessed and searched and processed by the electronic computer in the equipment management unit 15. For example, in the research section, a diagnosed result of equipment can be evaluated based on the data analyzed in the analysis sever 16. Further, in the maintenance and planning section, a maintenance plan of diagnosed equipment can be made based on the data analyzed in the analysis server 16. Furthermore, in the design section the data analyzed in the analysis server 16 can be used for design and development assistance of the equipment.

As the analysis server 16 receives the data from the operation monitoring unit 11, a calculation processing part in the analysis server 16 accesses the database 17 to call out the current operation data of the equipment. Further, the analysis server 16 diagnoses damage and lifetime of the equipment composing the gas turbine electric power generating facility 1 using the operation data at present and the data from the sensors 10.

The diagnosed object of the present embodiment is not limited to only one gas turbine electric power generating facility, but the diagnosed objects can be extended to the other gas turbine electric power generating facilities 23. These electric power generating facilities are connected to the equipment management unit 15 using a communication line 13. In general, the equipment management unit 15 receives data equally from all the monitored objects of the gas turbine electric power generating facilities 23. However, when an urgency of diagnosing one gas turbine electric power generating facility increases, the data from the one gas turbine electric power generating facility is received giving priority over the data from the other gas turbine electric power generating facilities.

Figure 2:
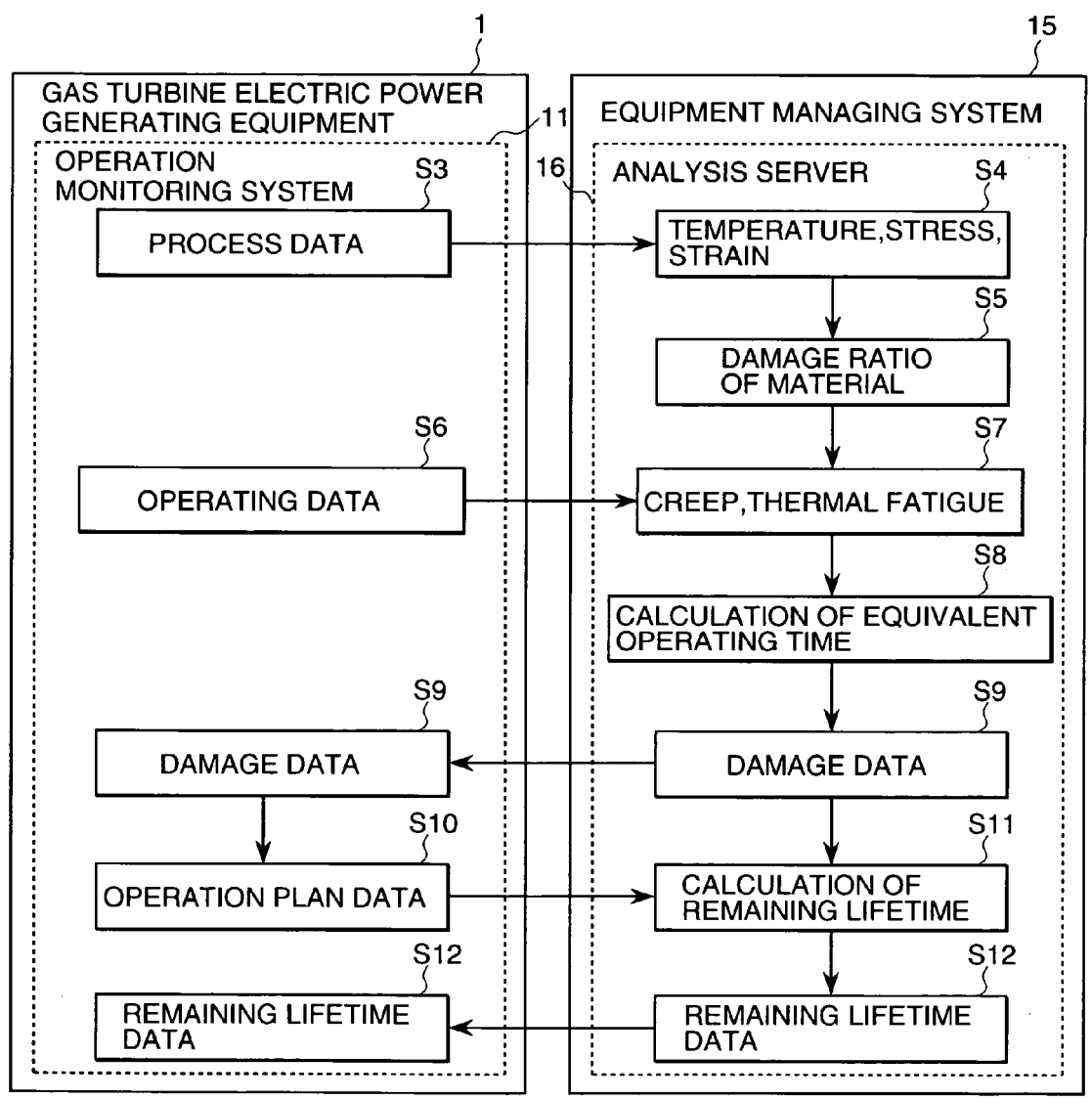
FIG. 2 is a schematic flow diagram showing the processing of damage diagnosis of high temperature component part and lifetime diagnosis of a gas turbine in the embodiment of FIG. 1.

FIG. 2 shows rough flows of the various kinds of data in an embodiment of the damage diagnosis and the lifetime diagnosis in accordance with the present invention. Referring to FIG. 2, in Step S3, the process data is provided from the operation monitoring unit 11 in the gas turbine electric power generating facility 1 side to the analysis server 16 side of the equipment management unit 15; and the analysis server 16 calculates temperature and stress and strain, shown in Step S4, with respect to high temperature component parts; and change of a damage ratio of the high temperature component part (material), shown in Step S5, is calculated; and by taking in the operation data provided from the operation monitoring unit 11 to the analysis sever 16 side in Step S6, the analysis server 16 calculates degrees of damage of creep and thermal fatigue using the operation data and the change of damage ratio in Step S7; and an equivalent operating time of the high temperature component part (material) is calculated in Step S8. The data on damage is transmitted from the analysis sever 16 to the operation monitoring unit 11 in Step S9, and then, the data on damage is provided to the side of a person in charge of operation of the gas turbine. As the person in charge of operation of the gas turbine prepares operation plan information and inputs it into the operation monitoring unit 11 in Step S10, the operation plan information is transmitted to the analysis sever 16 side; and the analysis server 16 calculates a remaining lifetime based on the information in Step S11. Finally, the information on remaining lifetime is transmitted from the analysis server 16 to the operation monitoring unit 11 in Step S12 to be provided to the person in charge of operation of the gas turbine. In Step S9 to Step S12, it is not always necessary to transmit the information on damage and the information on remaining lifetime to the person in charge of operation of the gas turbine.

As described above, the processing in each of Steps S4, S5, S7, S8 and S11 is performed by the analysis sever 16 in the equipment management unit 15. The processing in each of the Steps described just above is executed either voluntarily by a person in charge of diagnosing the facility or automatically. Each of Steps S3, S6, S9, S10 and S12 involve information processed in the operation monitoring unit 11 of the gas turbine electric power generating facility 1. Steps S9 and S12 involve information which the person in charge of diagnosing the facility obtains in the analysis sever 16, and the information is also provided to the person in charge of operation of the gas turbine. Step 10 involves information which can not be provided to the analysis server 16 until the person in charge of operation of the gas turbine determines operation plan information and inputs it to the operation monitoring unit 11. The person in charge of operation of the gas turbine can prepare the operation plan and the maintenance plan based on the information in each of Steps S9 and S12.

FIG. 3 can be obtained by detailing the rough flow of data processing shown in FIG. 2. In the present embodiment, when damage and lifetime diagnoses of the high temperature component parts are performed using the process data, a preparation Step S35 shown from Step S13 to Step S17 is performed in advance. The processing of preparation Step S35 is performed by the person in charge of diagnosing the facility using the analysis server 16 of FIG. 1. The processing of the preparation Step S35 may be performed by a person other than the person in charge of diagnosing the facility, and further, the processing of preparation Step 35 shown by Step 13 to Step 17 may be performed using another analysis server. As a result, by the processing work shown by Step 13 to Step 17, it is sufficient that data on relational equations obtained through the processing of the preparation Step S35 is input into a knowledge base 18.

In the preparation Step S35, master curves expressing relationship between change of temperature ΔT and damage ratios $D_c$, $D_f$ of a material, shown in FIG. 3, are initially generated in Step 13. In these graphs, the abscissa expresses temperature $T_m$, and the ordinates express damage ratios $D_c$ and $D_f$, respectively. Changes of damage ratios $D_{c0}$ and $D_{f0}$ with respect to design base temperature $T_{m0}$ are expressed by functions, and the damage ratios $D_c$ and $D_f$ change corresponding to temperature change from the design base temperature $T_{m0}$. The master curves expressing relationship between change of temperature ΔT and damage ratios $D_c$, $D_f$ are generated with respect to thermal fatigue damage and creep damage, respectively, for each material and for each diagnosed position of the high temperature component parts. Therein, in a case where the other damage modes are evaluated, graphs with respect to the other damage modes should be generated.

In Step S14, process data and relational equations of thermal boundary condition of the diagnosed high temperature component parts are generated. The relational equations will be described in explanation of Equation 1.

$$T_b = C_0 T + C_1$$

$$T_c = C_2 T + C_3 \quad \text{(Equation 1)}$$

$T_b$: ambient gas temperature [° C.]
$T_c$: cooling gas temperature [° C.]
$T_\alpha$: sensor temperature 1 [° C.]
$T_\beta$: sensor temperature 2 [° C.]
$C_i$: coefficients of the relational equations between sensor and thermal boundary condition When temperature $T_m$, stress σm and strain $\epsilon_m$ of the diagnosed high temperature component part are analyzed through the finite element method, the thermal boundary conditions of the diagnosed high temperature part are estimated based on some number of items of the process data (temperature) from the sensors installed to the component part of the gas turbine. The thermal boundary conditions are the ambient gas temperature $T_b$ of the diagnosed high temperature part and the cooling gas temperature $T_c$ of the diagnosed high temperature part. The relational equations between these temperatures and the process data (temperatures $T_\alpha$ and $T_\beta$) are formulated as Equation 1 in advance. Although in the relational equations shown here, each of the thermal boundary conditions of the diagnosed high temperature component part is expressed by a linear function of the process data, another type of function may be used, and the number of used items of the process data may be increased.

In Step S15, the thermal boundary conditions to be used for the finite element method analysis of the diagnosed high temperature component parts are calculated. In Step S16, thermal and structural analyses through the finite element method are executed. In these analyses, the thermal boundary conditions are defined as shown in FIG. 5. Both of the ambient gas temperature $T_b$ and the cooling gas temperature $T_c$ are changed with respect to their design conditions, respectively. In the example of FIG. 5, the ambient gas temperature is changed within the range of plus and minus 10° C. with respect to the design base temperature, and the cooling gas temperature is changed within the range of plus and minus 40° C. with respect to the design base temperature. In addition, as the other operation conditions of the gas turbine, thermal boundary conditions at trip shutdown of the gas turbine, typical thermal boundary conditions at load changing of the gas turbine, stress $\sigma_m$ and strain $\epsilon_m$ by a centrifugal force acting on the rotor blade without thermal stress during rotating are calculated.

Figure 6:
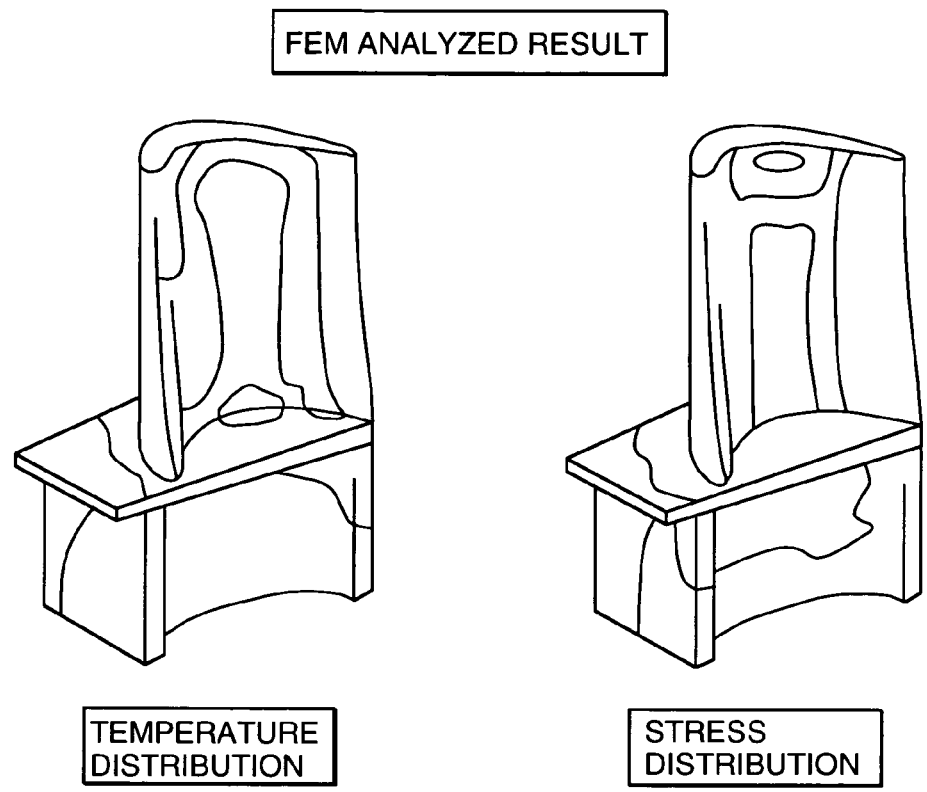
FIG. 6 provides views showing examples of results analyzed by the finite element method.

FIG. 6 shows analyzed results of the rotor blade through the finite element method as an example. In Step 17, relational equations of temperature $T_m$, stress $\sigma_m$ and strain $\epsilon_m$ are made based on the results of the previous steps. The relational equations will be described in explanation of Equation 2.

$$T_m = r_0 + r_1 T_b + r_2 T_b^2 + r_3 T_c + r_4 T_c^2 + r_5 T_b T_c [° \text{C.}]$$

$$\sigma_m = r_6 + r_7 T_b + r_8 T_b^2 + r_9 T_c + r_{10} T_c^2 + r_{11} T_b T_c [\text{MPa}]$$

$$\epsilon_m = r_{12} + r_{13} T_b + r_{14} T_b^2 + r_{15} T_c + r_{16} T_c^2 + r_{17} T_b T_c \quad \text{(Equation 2)}$$

$T_m$: temperature of diagnosed component part [° C.]
$\sigma_m$: stress of diagnosed component part [MPa]
$\epsilon_m$: strain of diagnosed component part
$r_i$: coefficients of relational equations between thermal boundary condition and temperature, stress and strain
$T_b$: ambient gas temperature [° C.]
$T_c$: cooling gas temperature [° C.]

When temperature $T_m$, stress $\sigma_m$ and strain $\epsilon_m$ of a diagnosed high temperature component part are estimated from the process information (temperatures $T_\alpha$ and $T_\beta$) of sensors attached to the component equipment of the gas turbine, the relational equations between temperature $T_m$, stress $\sigma_m$, strain $\epsilon_m$ and thermal boundary conditions of a diagnosed high temperature component part are made as shown by Equation 2 in advance. Although in the relational equations shown here, temperature Tm, stress $\sigma_m$ and strain $\epsilon_m$ are expressed by quadratic functions of thermal boundary conditions of diagnosed high temperature component part, another type of function may be used, and number of thermal boundary conditions may be increased.

Since the relational equations between temperature $T_m$, stress $\sigma_m$, strain $\epsilon_m$ and thermal boundary conditions of the diagnosed high temperature component part have been made through Step S13 to Step S17, the creep damage Dc and the thermal fatigue damage Df can be calculated without executing the analysis of finite element method from now on. These relational equations are stored in the knowledge base 18 of FIG. 1 as data on damage. The knowledge base 18 is stored together with the database 17 in the identical analysis server 16.

Flow of actually performing damage diagnosis and lifetime diagnosis will be described below. Initially, in Step S20, the person in charge of diagnosing the facility inputs selection of a component part to be diagnosed from the analysis server at an arbitrary timing. Various kinds of process data and operation data and knowledge data necessary for damage diagnosis with respect to the selected component part are sorted and set so as to be input at the necessary timing. Next, in Step S21, the person in charge of operation of the facility determines an operation plan PL of the gas turbine electric power generating facility and performs its input operation. The data is transmitted to the analysis server 16. In Step S22, the analysis server 16 reads coefficients A, B, C used for on-line damage diagnosis and data of reference damage ratios $D_{c0}$, $D_{f0}$ from the knowledge base 18 stored together with database 17 in the identical analysis server 16. The coefficients A, B, C are factors for converting a number of events to time, and the coefficient A relates to a number of startup-and-shutdown times. The coefficient B relates to number of load change times; and the coefficient C relates to number of trip shutdown times.

In Step S23, the analysis server reads the process data and the operation data of the gas turbine electric power generating facility 1 received from the operation monitoring unit 11, that is in this case, number of operation times i, number of startup-and-shutdown times j, number of load change times k, number of trip shutdown times 1, actual operating time H, and temperatures $T_{nm}$.

Figure 7:
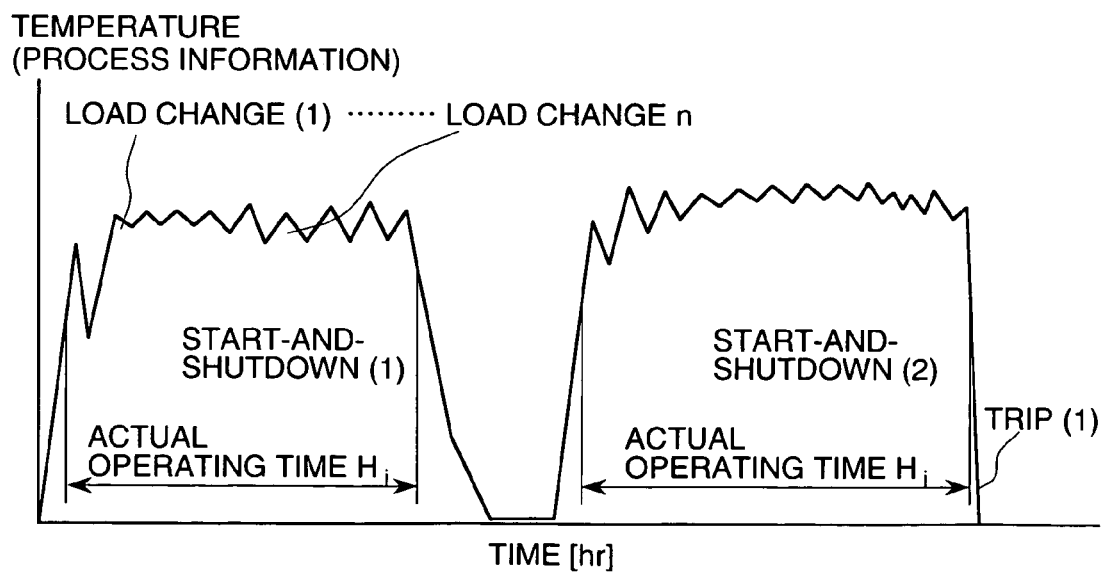
FIG. 7 is a chart showing actual operating time and a measurement range of temperature change.

Here, description will be made of a method of calculating actual operating time Hi in creep damage Dc-OL and number of load change times in thermal fatigue damage Df-OL, referring to FIG. 7. Since the creep damage depends on time (time span) being kept at a temperature, an actual time of creep damage is defined as a time span in which a component part (a material) is actually being kept at an arbitrary temperature while operating the gas turbine. The arbitrary temperature may be a design temperature or the other temperatures.

On the other hand, in regard to the load change relating to the thermal fatigue damage $D_{f-OL}$, a number of relatively large temperature change times caused by starting up and shutting down the gas turbine, a number of temperature change times caused by load change during operation and a number of temperature change times caused by trip shutdown of the gas turbine are individually measured every time when the temperature change occurs. Further, the other load changes may be taken into consideration.

The creep damage and thermal fatigue damage analyses are executed based on the calculated temperature $T_m$, stress $\sigma_m$ and strain $\epsilon_m$. Equation 3 and Equation 4 are used for calculating the creep damage and the thermal fatigue damage.

$$D_{c-OL} = \sum_{i}^{I} \left\{ H_i \times \frac{D_c(T_{lm})}{D_{c0}} \right\} \text{ [hr]} \quad \text{(Equation 3)}$$

$D_{c-OL}$: equivalent operating time relating to creep damage [hr]
$H_i$: actual operating time [hr]
$D_c$: creep damage ratio at a present temperature
$D_{c0}$: creep damage ratio at design base temperature
$T_{im}$: temperature of a diagnosed component part under operation [° C.]
i: number of operation times When the equivalent operating time relating to creep damage $D_{c-OL}$ of the component equipment is calculated from the process data (temperatures $T_\alpha$ and $T_\beta$) measured by the sensors installed to the gas turbine and the operation information, Equation 3 is used. In Equation 3, part of the on-line equivalent operating time $L_{OL}$ which is influenced by creep damage is expressed by the operating time $H_i$ and the creep damage ratio at design base $D_{c0}$ and a changing ratio of the creep damage caused by temperature change $D_c$.

$$D_{f-OL} = A \times \sum_{j}^{J} \frac{D_f(T_{jm})}{D_{f0}} + B \times \sum_{k}^{K} \frac{D_f(T_{km})}{D_{f0}} + C \times \sum_{l}^{L} \frac{D_f(T_{lm})}{D_{f0}} \text{ [hr]} \quad \text{(Equation 4)}$$

$D_{f-OL}$: equivalent operating time relating to thermal fatigue damage [hr]
A: coefficient for converting number of startup-and-shutdown times to equivalent operating time
J: number of startup-and-shutdown times
$D_f$: thermal fatigue damage ratio at a present temperature
$D_{f0}$: coefficient converting number of load change times to equivalent operating time
B: coefficient for converting number of load change times to equivalent operating time
K: number of load change times
C: coefficient for converting number of trip shutdown times to equivalent operating time
L: number of trip shutdown times
$T_{nm}$: temperature [° C.]

When the equivalent operating time relating to thermal fatigue damage $D_{f-OL}$ of the component equipment is calculated from the process data (temperatures $T_\alpha$ and $T_\beta$) measured by the sensors installed to the gas turbine and the operation data, Equation 4 is used. In Equation 4, part of the on-line equivalent operating time LOL which is influenced by thermal fatigue damage is expressed by the thermal fatigue damage ratio at design base $D_{f0}$ and a changing ratio of the thermal fatigue damage caused by temperature change $D_f$. The three terms in the equation are thermal fatigue relating to startup-and-shutdown, thermal fatigue relating to macroscopic load change during operation and thermal fatigue relating to trip shutdown, respectively. At evaluating thermal fatigue damage, it is not always necessary to use all the terms, and the other additional terms may be used.

In Step S25, using the above information, an on-line equivalent operating time $L_{OL}$ is calculated by Equation 5.

$$LOL = D_{C-OL} + D_{f-OL} \text{[hr]} \quad \text{(Equation 5)}$$

$L_{OL}$: on-line equivalent operating time [hr]

When the equivalent operating time LOL of the component equipment is calculated from the process data (temperatures $T_\alpha$ and $T_\beta$) measured by the sensors installed to the gas turbine and the operation data, Equation 5 is used. Here, it is defined that the equivalent operating time LOL of the component equipment is expressed by a linear sum of the creep damage Dc-OL shown by Equation 3 and the thermal fatigue damage Df-OL shown by Equation 4. These equations are read out from the knowledge base.

In Step S26, it is judged whether or not the equivalent operating time at present has exceeded in a replacing lifetime of a diagnosed component part. This judgment is automatically executed by the analysis server by predetermining a scheduled inspection and replacement plan (management base) $L_{st}$ of the equipments and by comparing the equivalent operating time at present with the management base $L_{st}$. If the calculated on-line equivalent operating time $L_{OL}$ is smaller than values of the management base $L_{st}$ of individual equipments, the remaining lifetime RL is calculated in Step S27. If the calculated on-line equivalent operating time $L_{OL}$ is larger than value of the management base $L_{st}$ of the component part, the processing proceeds to Step S28 without calculating the remaining lifetime RL. At that time, the following methods can be considered as the method of calculating the lifetime.

a method of regression analysis using previous data a method of using the design base operation pattern as a standard a method of using a changing rate (differential value) at a time point of evaluation However, methods of predicting a remaining lifetime other than the above may be used.

For example, in the above item (1), operation data up to present time from the starting of operation is approximated using a polynomial function, and change of the equivalent operating time from then on is extrapolated using the function. In the above item (2), if the operation is continued under the design condition, a straight line has a gradient equal to that of the normal equivalent operating time because the temperature difference to the design value becomes zero. Further, according to the above item (3), by setting the gradient to the changing ratio in operating data obtained from several times of preceding operation from the present time, the remaining lifetime is predicted by extrapolating with a straight line. Maximum and minimum remaining lifetimes can be determined from a point of intersection of a line expressing the change of equivalent operating time predicted by the methods of the above items (1), (2), (3) and the other methods and a line expressing the predetermined scheduled inspection and replacement plan (management base) and a point of position expressing the damage diagnosis at present. The diagonally shaded part shown in FIG. 10 can be determined as described above.

In Step S27, a maximum predicted remaining lifetime $RL_{max}$ and a minimum predicted remaining lifetime $RL_{min}$ are calculated using the methods described in the above items (1) to (3). In Step S29, the result is displayed.

Figure 10:
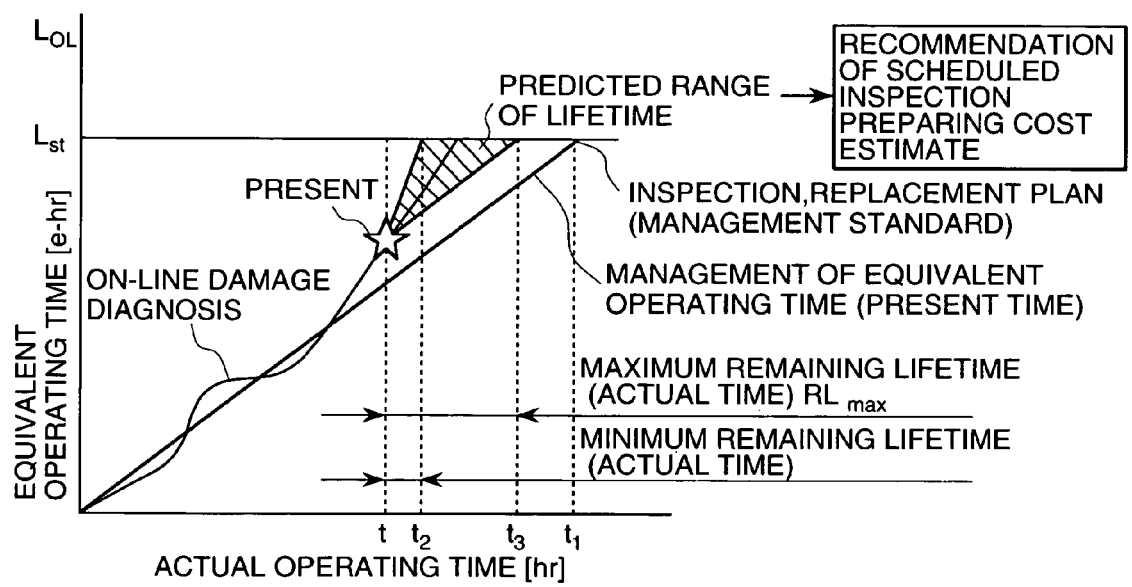
FIG. 10 is a graph for a damage diagnosis of high temperature component parts and a lifetime prediction of the gas turbine in the embodiment in accordance with the present invention.

FIG. 10 is a graph showing an on-line damage diagnosis and a lifetime prediction. In the graph, the abscissa expresses actual operating time of equipment, and the ordinate expresses on-line equivalent operating time. According to the remote diagnosis system in accordance with the present invention, the result of damage diagnosis at present can be displayed in real time, as shown by the graph, and the predicted value of lifetime and its predicted range are quantitatively displayed as shown by the diagonally shaded area in the graph.

The result of the on-line equivalent operating time LOL and the result of predicted lifetimes $RL_{max}$ and $RL_{min}$ can be inspected by all the WWW severs or WWW browsers in the equipment management unit 15, and further, can be inspected also by the operation monitoring unit 11 of the gas turbine electric power generating facility 1. Thereby, a person in charge of maintenance and service can be aware of the operating condition of the gas turbine electric power generating facility. On the other hand, the person in charge of operation of the facility can know the lifetimes at present of the equipments composing the gas turbine electric power generating facility 1 using the function of the WWW browser of the operation monitoring unit 11. Further, the person in charge of operation of the facility can perform reviewing and planning of the operating method and the maintenance plan of the gas turbine equipment.

In Step S28 or Step S29, by viewing the result of the on-line equivalent operating time $L_{OL}$ and the results of the predicted lifetimes $RL_{max}$ and $RL_{min}$, the person in charge of operation or the person in charge of maintenance and service inputs the judged result on whether or not the operation of equipment is continued. In Step S30, the person in charge of operation or the person in charge of maintenance and safekeeping inputs the operation plan R. If it is judged in Step S30 that the operation is continued, the operation of the facility is stopped in Step S32. On the other hand, if it is judged that the operation is continued, the processing is returned to Step S21.

FIG. 8 shows process data, operation data and maintenance data applicable to the diagnosis system of gas turbine in accordance with the present invention. In regard to items of the process data, there are exhaust gas temperature a1, wheel space temperature a2, discharge air temperature a3, discharge air pressure a4, combustor flame stabilizer temperature a5, fuel flow rate a6, inlet air temperature a7, inlet air pressure a8, inlet air humidity a9, inlet adjustable blade angle a10, rotating speed a11, bearing vibration a12, shaft vibration a13, bearing metal temperature a14, pressure at each stage of compressor a15, air temperature at each stage of compressor a16, pressure change at each stage of compressor a17, Na sensor of suction air a18, compressor blade stress a19, compressor blade temperature a20, turbine blade stress a21, turbine blade temperature a22, combustor stress a23, combustor temperature a24, casing temperature a25, casing stress a26, casing acceleration a27, casing displacement a28, exhaust gas components a29, and fuel components a30. In regard to items of the operation data, there are number of startup-and-shutdown times b1, combustion time b2, number of trip shutdown times b3, number of load change times b4, power generating output b5, power generating efficiency b6, compressor efficiency b7, and actual operating time b8.

In regard to items of the maintenance data, there are crack length c1, number of cracks b2, thinned-down weight of wall c3, thinned-down volume of wall c4, thinned-down area of wall c5, number of thinned-down wall portions c6, peeled area of coating c7, number of peeled coating portions c8, corroded area c9, number of corroded portions c10, date of scheduled inspection c11, number of scheduled inspection times c12, number of water cleaning operation times of compressor c13, date of water cleaning operation of compressor c14, and pH of water used for cleaning operation of compressor c15.

These items of information are items which are somewhat influenced by changes in the damage state of the gas turbine. However, when the damage diagnosis and the lifetime diagnosis of the high temperature component parts are performed, it is not always necessary to use all the items of information, but it is sufficient to select and use main items of information. Further, the other items of the information may be used.

FIG. 9 shows an embodiment of high temperature component parts to be diagnosed damage and lifetime, and their degradation modes using the diagnosis system in accordance with the present invention; and process data and operation data used for the damage diagnosis and the lifetime diagnosis of the high temperature component parts. The high temperature parts to be diagnosed are the combustor liner d1, the combustor transition piece d2, the turbine stator blade d3, and the turbine rotor blade d4. As for the combustor liner d1, damages such as thermal fatigue e1, creep deformation e2, and oxidation and corrosion e3 become problems. As for the combustor transition piece d2, degradation and damage modes of thermal fatigue e4 and creep deformation e5 become problems. As for turbine stator blade d3, degradation and damage modes of thermal fatigue e1, creep deformation e2, and oxidation and corrosion e3 become problems. As for the turbine rotor blade d4, degradation and damage modes of thermal fatigue e1, creep deformation e2, oxidation and corrosion e3 become problems.

Since the thermal fatigue damage relates to an amount of temperature change in the component part and number of the change times, the items of the operation data and the process data used for diagnosis of the thermal fatigue damage of, for example, the combustor liner d1 are numbers of startup-and-shutdown times, load change times and trip shutdown times b1, b3 and b4, and exhaust gas temperature a1, discharge air temperature a3 and combustor stabilizer temperature a5. Since the damage caused by creep deformation relates to absolute temperature and time duration kept at the temperature, the items of the operation information and the process information used for the damage diagnosis are actual operating time b8, exhaust gas temperature a1, discharge air temperature a3 and combustor flame stabilizer temperature a5.

Similarly, the damage diagnosis can be performed on the other high temperature component parts, that is, the rotor blade and the stator blade, and at that time, the items of the sensor information, the operation data and the maintenance data described in FIG. 8 may be used. Therein, it is not always necessary to use all the items of information described as the items of the sensor's data, the operation data and the maintenance data, and further, the other information may be added.

Figure 11:
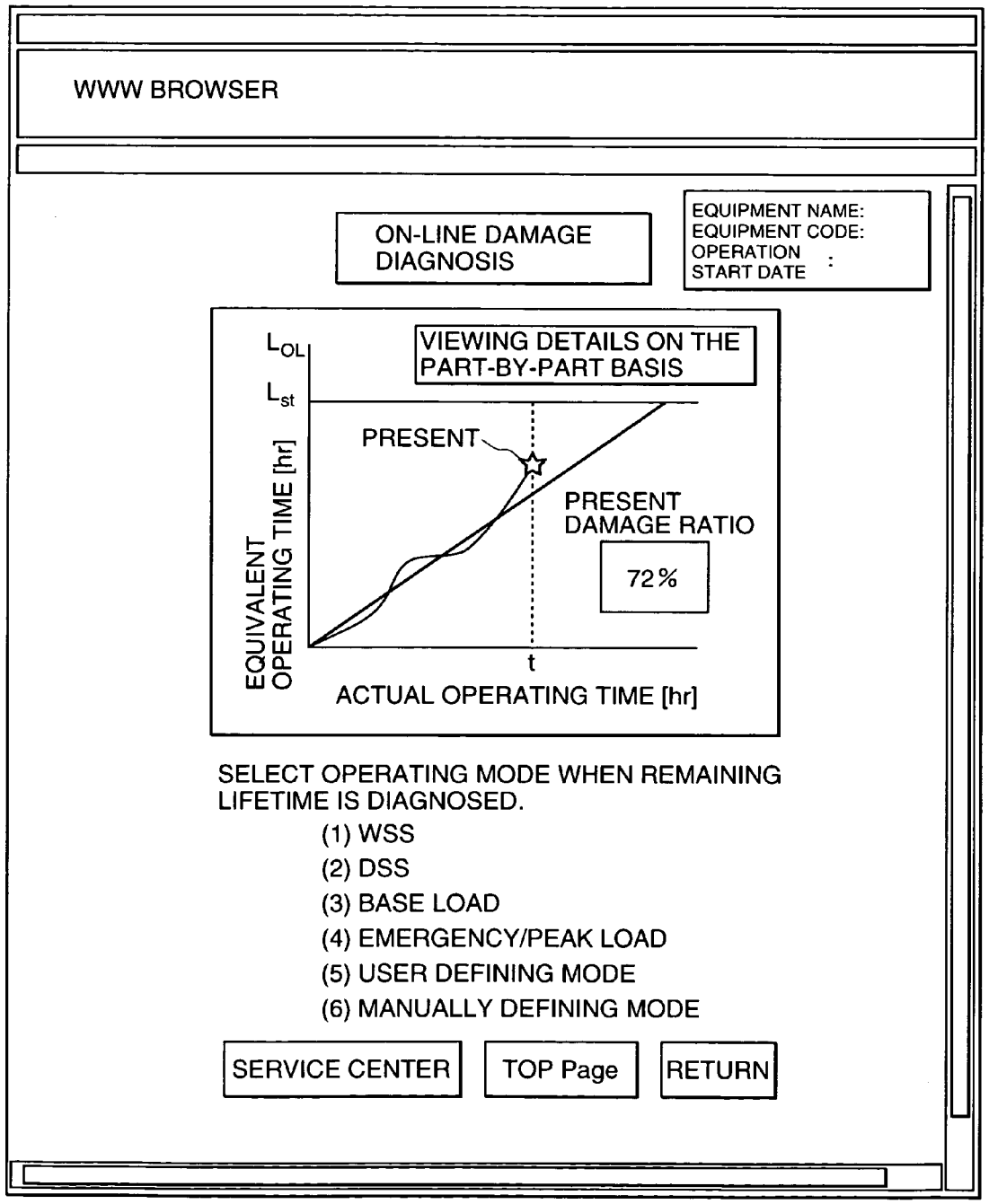
FIG. 11 is a view showing an output example of a web picture of the damage diagnosis of high temperature component parts and the lifetime prediction of the gas turbine in the embodiment in accordance with the present invention.

FIG. 11 shows an output example of a web picture of a result of gas turbine damage diagnosis. In the picture, items of equipment name, equipment code, operation start date name of organization etc are displayed. As shown in the figure, the damage ratio LOL at present time and the changing process of the damage ratio up to present time are displayed by a graph, and a predicted value and a predicted range of lifetime of the equipment are quantitatively displayed. In the picture of FIG. 11, in order to further execute the lifetime diagnosis, an operating mode used for calculation of the lifetime can be selected. There, typical modes of WSS (weekly scheduled service) mode, DSS (daily scheduled service) mode, emergency and peak load mode, user defining mode, manually defining mode, etc are selectable.

The person in charge of operation can evaluate the lifetime of the equipment by selecting one from these modes (by clicking on the web picture). A operating mode desired by the person in charge of the operation is registered into the user defining mode in advance. Further, by inputting various operating modes into the manually defining mode each time, lifetime prediction corresponding to the input operating mode can be performed.

Furthermore, communication with the maintenance service center can be performed by clicking a button on the picture. It is not always necessary that contents of the picture are equal to the contents described above insofar as the picture contents include information showing a damage condition of the gas turbine electric power generating facility at present and make it possible to input the operation plan prepared by the person in charge of operation. Further, the contents of the picture may be viewed by both of the person in charge of operation of the gas turbine electric power generating facility and the person in charge of maintenance and service.

Figure 12:
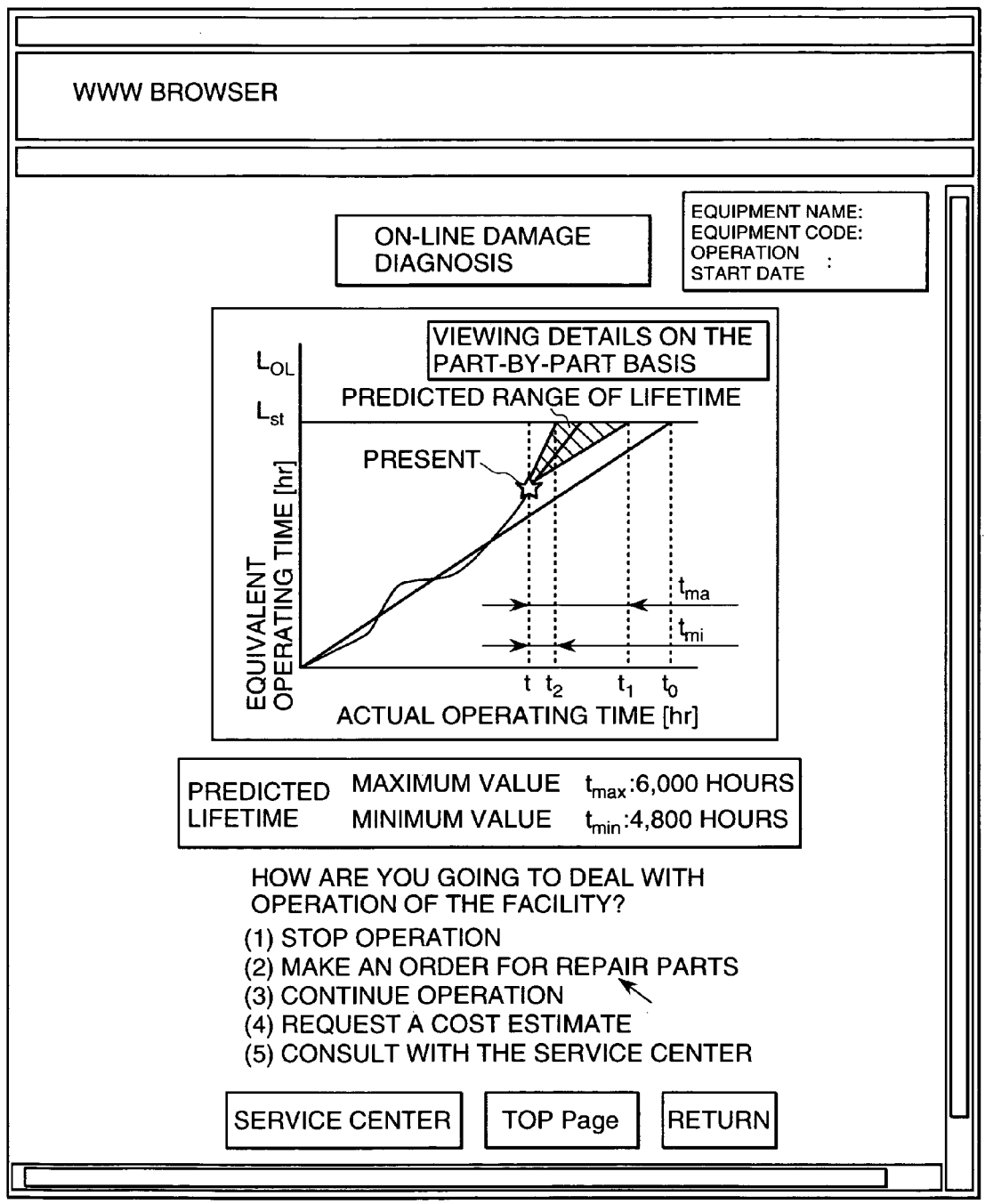
FIG. 12 is a view showing an output example of a web picture of the damage diagnosis of high temperature component parts and the lifetime prediction of the gas turbine in the embodiment in accordance with the present invention.

FIG. 12 shows an output example of a web picture of lifetime diagnosis of the gas turbine. In FIG. 12, predicted values of the maximum value $RL_{max}$ and the minimum value $RL_{min}$ of the lifetimes calculated according to the operating modes selected in FIG. 11 are displayed both by graph and by numerals. Further, in the picture of FIG. 12, continuation of operating the facility, stop of operation of the facility, making an order for repair parts, requesting a cost estimate, and consulting with the service center can be selected on the web picture.

It is not always necessary that contents of the picture are equal to the contents described above insofar as the picture contents include display of the remaining lifetime of the gas turbine electric power generating facility at present and make it possible to input the operation plan prepared based on the displayed remaining lifetime by the person in charge of operation. Further, the contents of the picture may be viewed by both the person in charge of operation the gas turbine electric power generating facility and the person in charge of maintenance and service.

Figure 13:
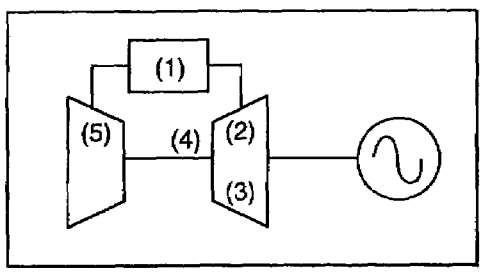
FIG. 13 is a view showing an output example of a web picture of the damage diagnosis of component parts on the part-by-part basis and the lifetime prediction of the gas turbine in the embodiment in accordance with the present invention.

FIG. 13 shows an output example of a web picture of damage ratios on a part-by-part basis. In FIG. 13, component part codes are allocated in the vertical direction, and items of information on individual component parts, for example, name of component part, date of last replacement, planned date of next replacement, damage ratio at present, predicted remaining lifetime, other remarks, etc are filled in the lateral direction. Further, details of damage data and an image of the damage can be known by selecting the corresponding name of a component part (clicking on the web picture). The contents of the picture may be viewed by both of the person in charge of operating the gas turbine electric power generating facility and the person in charge of maintenance and service, or only by the person in charge of maintenance and service.

FIG. 14 shows an output example of a picture on the WWW server or the www browser in the equipment management unit side. In this picture, the person in charge of maintenance and safekeeping may view information on all the relating electric power generating facilities, for example, facilities in service at present, facilities out of service at present and facilities under planning. Management of and viewing diagnosed equipment can be performed using this picture on the WWW server/browser.

Items of information of each of equipment item are management code, name of customer, name of equipment model, starting date of operation, status at present, date of next scheduled maintenance, and the other information items for the diagnosed equipment. Further, it is possible to access component part information for each item of equipment. Furthermore, damage diagnosis, lifetime diagnosis, search of past damage cases, management and view of stock of repair parts and manufacturing status of repair parts, etc can be performed using the same picture on the WWW server/browser. The above-described operations can be executed by selecting a related item (by clicking on the web picture) to move the site. The contents of this picture are not disclosed to any outsiders except the persons in charge of maintenance and service of the equipment.

As described above, using the present system, the person in charge of operation can know the operation condition of the equipment, the diagnosis result of damage, the predicted value of lifetime from the picture of the WWW browser, and also can perform continuing or stopping operation of the facility, making an order for repair parts, etc with the picture of the WWW browser.

Thereby, according to the first embodiment, the person in charge of operation of the gas turbine electric power generating facility can know the damage condition and the predicted value of lifetime of the facility under operation.

Further, since there is freedom of selection in the operation plan and in the maintenance plan, it is possible to reduce the maintenance cost, to improve the reliability of the gas turbine electric power generating facility, and to increase the freedom of operation of the equipment.

On the other hand, the person in charge of maintenance and service can know the damage condition and the predicted value of lifetime of the gas turbine electric power generating facility 1 in real time using the WWW server or WWW browser in the equipment management unit 15. Further, the person in charge of maintenance and service can immediately know of a maintenance request of the person in charge of operation of the gas turbine electric power generating facility input to the operation monitoring unit 7. Thereby, the person in charge of maintenance and service can respond to the request from the person in charge of operation.

Since the remote monitoring system described above is composed of the WWW server or WWW browser, it is possible to largely reduce the time required for exchanging information between the person in charge of operation and the person in charge of maintenance and service of the gas turbine electric power generating facility, and between the persons in charge of maintenance and service.

As described above, according to the present invention, since the actual damage condition is reflected in the diagnoses of the damage condition and the lifetime of the gas turbine electric power generating facility by introducing the real time data from the process data during operating of the gas turbine, it is possible for the diagnosis to be highly accurate and performed in real time, and the person in charge of operation and the person in charge of maintenance and service can possess the data jointly at once. The time required for planning, deciding and making an order of the maintenance plan is reduced, and accordingly, the operating cost of the gas turbine electric power generating facility can be reduced.

The persons in charge of maintenance and service include a person who has installed the gas turbine electric power generating facility, a person who has accepted the order of the gas turbine electric power generating facility, a person who has installed the facility management unit, and a manager of the above person, an employer of the above person, a person responsible for the above person, and the like.

The facilities of interest of the present invention are not limited to the gas turbine electric power generating facility; the present invention can be applied to a combined electric power generating plant using a gas turbine and a cogeneration plant using a gas turbine.

UTILIZATION OF THE INVENTION

The present invention may be used in the technical field of determining a present damage condition of equipment composing a combined electric power generating plant or a cogeneration plant. In the combined power plant, electric power is generated by combining a gas turbine and a steam turbine. On the other hand, in the cogeneration plant, electric power is generated by a gas turbine, and heat to be used for making hot water and heating rooms is produced by operation of the gas turbine.

What is claimed is:

1. A method of diagnosing a condition of a gas turbine, the method comprising the steps of:

calculating a value of equivalent operating time using operation data of a gas turbine and process data during operation of said gas turbine, said process data being measured by sensors installed to said gas turbine during operation of said gas turbine, said value of equivalent operating time being a value at which a degree of damage of component parts composing said gas turbine is evaluated by operating time; and diagnosing a condition of said gas turbine based on said calculated value of equivalent operating time and a predetermined management basis.

2. A method of diagnosing a condition of a gas turbine according to claim 1, wherein said value of equivalent operating time is calculated by adding values of equivalent operating time each of which is calculated for each of degradation-and-damage modes.

3. A method of diagnosing a condition of a gas turbine according to claim 2, wherein thermal fatigue damage is included in said degradation-and-damage modes as one mode; and a value of equivalent operating time relating to said thermal fatigue damage is calculated as a sum of a plurality of values of equivalent operating time selected from the group consisting of a value of equivalent operating time corresponding to the number of startup-and-shutdown times, a value of equivalent operating time corresponding to the number of load change times and a value of equivalent operating time corresponding to the number of trip shutdown times.

4. A method of diagnosing a condition of a gas turbine according to claim 3, wherein the value of equivalent operating time for each of the degradation-and-damage modes is calculated by multiplying a ratio by a value of actual operating time or a coefficient converting the number of times to time, said ratio being a ratio of a damage ratio obtained from information at a present time point to a damage ratio in a design base.

5. A method of diagnosing a condition of a gas turbine according to claim 4, which further comprises the step of predicting a remaining lifetime, said remaining lifetime being a difference between a predicted value of actual operating time when the equivalent operating time will reach a value of said management basis and a value of actual operating time corresponding to the value of calculated equivalent operating time at a present time point.

6. A method of diagnosing a condition of a gas turbine according to claim 4, which further comprises the step of predicting a maximum value and a minimum value of remaining lifetime, said remaining lifetime being a difference between a predicted value of actual operating time when the equivalent operating time will reach a value of said management basis and a value of actual operating time corresponding to the value of calculated equivalent operating time at a present time point.

7. A system of diagnosing a condition of a gas turbine, the system comprising:

sensors installed to the gas turbine;

means for calculating values of equivalent operating time using process information detected by said sensors and operation information of the gas turbine, each of said values of equivalent operating time being a value at which a degree of damage of a diagnosed position for each of a plurality of degradation-and-damage modes is evaluated by operating time;

means for calculating a value of whole equivalent operating time by adding said values of equivalent operating time for the individual degradation-and-damage modes;

means for diagnosing the condition of the gas turbine based on said calculated value of whole equivalent operating time and a predetermined management basis; and means for displaying a result diagnosed by said diagnosing means.

8. A system of diagnosing a condition of a gas turbine according to claim 7, which further comprises means for calculating the value of equivalent operating time for each of the plurality of degradation-and-damage modes by multiplying a ratio by a value of actual operating time or a coefficient converting the number of times to time, said ratio being a ratio of a damage ratio obtained from data at present to a damage ratio in a design base.

9. A system of diagnosing a condition of a gas turbine according to claim 8, which further comprises means for predicting a remaining lifetime until the equivalent operating time reaches said management basis from the calculated equivalent operating time of the diagnosed position.

10. A system of diagnosing a condition of a gas turbine according to claim 9, which further comprises means for predicting a maximum remaining lifetime and a minimum remaining lifetime until the equivalent operating time reaches said management basis from the calculated equivalent operating time of the diagnosed position.

11. A system of diagnosing a condition of a gas turbine, the system comprising:

an operation monitoring unit for acquiring process data from sensors installed to said gas turbine and operation data of said gas turbine;

communication units for transmitting each kind of data acquired in said operation monitoring unit;

an analysis server which calculates values of equivalent operating time using each kind of data transmitted through said communication units, each of said values of equivalent operating time being a value at which a degree of damage of a diagnosed position for each of a plurality of degradation-and-damage modes is evaluated by operating time, calculates a value of whole equivalent operating time by adding said values of equivalent operating time for the individual degradation-and-damage modes, and diagnoses the condition of the gas turbine based on said calculated value of whole equivalent operating time and a predetermined management basis; and a facility management unit having said analysis server and a WWW browser or WWW server.

12. A system of diagnosing a condition of a gas turbine according to claim 11, wherein said operation monitoring unit comprises means for displaying contents of a result analyzed by said analysis server and received through said communication units.

13. A method of diagnosing a condition of a gas turbine, the method comprising the steps of:

calculating a value of first equivalent operating time relating to creep damage of a component part composing said gas turbine, using operation data of said gas turbine and process data measured by sensors installed to said gas turbine, while operating said gas turbine;

calculating a value of second equivalent operating time relating to fatigue damage of the component part using said operation data and said process data;

calculating a value of third equivalent operating time based on the value of first equivalent operating time and the value of second equivalent operating time; and diagnosing a condition of said gas turbine based on the value of third equivalent operating time and a management basis.

14. A method of diagnosing a condition of a gas turbine, the method comprising the steps of:

calculating values of equivalent operating time for one deterioration mode and another deterioration mode, using operation data of said gas turbine and process data measured by sensors installed to said gas turbine, while operating said gas turbine, each of said values of equivalent operating time being a value at which a degree of damage of a component part composing said gas turbine is evaluated by operating time; and diagnosing a condition of said gas turbine based on the calculated values of equivalent operating time and a predetermined management basis.

15. A system for diagnosing a condition of a gas turbine, which comprises:

means for calculating a value of first equivalent operating time relating to creep damage of a component part composing said gas turbine, using operation data of said gas turbine and process data measured by sensors installed to said gas turbine, while operating said gas turbine;

means for calculating a value of second equivalent operating time relating to fatigue damage of said component part using said operation data and said process data;

means for calculating a value of third equivalent operating time based on said value of first equivalent operating time and said value of second equivalent operating time; and means for diagnosing a condition of said gas turbine based on said value of third equivalent operating time and a management basis.

16. A system for diagnosing a condition of a gas turbine, which comprises:

means for calculating values of equivalent operating time for one deterioration mode and another deterioration mode, using operation data of said gas turbine and process data measured by sensors installed to said gas turbine, while operating said gas turbine, each of said values of equivalent operating time being a value at which a degree of damage of a component part composing said gas turbine is evaluated by operating time; and means for diagnosing a condition of the gas turbine based on the values of equivalent operating time calculated by said calculating means and a predetermined management basis.

* * * * *